(12) United States Patent
Iwata et al.

(10) Patent No.: US 8,957,165 B2
(45) Date of Patent: Feb. 17, 2015

(54) ADDITION-CURABLE SILICONE COMPOSITION AND OPTICAL ELEMENT

(71) Applicant: Shin-Etsu Chemical Co., Ltd., Tokyo (JP)

(72) Inventors: Mitsuhiro Iwata, Takasaki (JP); Toshiyuki Ozai, Takasaki (JP); Yukito Kobayashi, Takasaki (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 14/095,236

(22) Filed: Dec. 3, 2013

(65) Prior Publication Data

US 2014/0171599 A1    Jun. 19, 2014

(30) Foreign Application Priority Data

Dec. 18, 2012  (JP) ................. 2012-276169

(51) Int. Cl.
*C08L 83/08* (2006.01)
*G02B 1/04* (2006.01)

(52) U.S. Cl.
CPC ...................... *G02B 1/04* (2013.01)
USPC ............. 525/478; 525/477; 528/15; 528/31; 528/32; 528/42

(58) Field of Classification Search
None
See application file for complete search history.

(56) References Cited

U.S. PATENT DOCUMENTS

| | | | | |
|---|---|---|---|---|
| 4,322,320 | A * | 3/1982 | Caprino .................. | 523/212 |
| 5,519,096 | A * | 5/1996 | Hara ....................... | 525/478 |
| 7,407,710 | B2 * | 8/2008 | Qiu et al. ................ | 428/447 |
| 2004/0178509 | A1 | 9/2004 | Yoshino et al. | |
| 2005/0212008 | A1 | 9/2005 | Miyoshi | |
| 2006/0073347 | A1 | 4/2006 | Morita et al. | |
| 2006/0081864 | A1 | 4/2006 | Nakazawa | |
| 2007/0112147 | A1 | 5/2007 | Morita et al. | |
| 2010/0145000 | A1 | 6/2010 | Kimura | |
| 2013/0236730 | A1 * | 9/2013 | Bose et al. .............. | 428/447 |

FOREIGN PATENT DOCUMENTS

| | | |
|---|---|---|
| JP | A-2004-143361 | 5/2004 |
| JP | A-2004-186168 | 7/2004 |
| JP | A-2004-292807 | 10/2004 |
| JP | A-2004-359756 | 12/2004 |
| JP | A-2005-076003 | 3/2005 |
| JP | A-2005-105217 | 4/2005 |
| JP | 2005-126554 | * 5/2005 |
| JP | A-2005-307015 | 11/2005 |
| JP | A-2010-132795 | 6/2010 |

OTHER PUBLICATIONS

Abstract for JP 2005-126554 (no date).*
Abstract for CN 103725199 (no date).*

* cited by examiner

*Primary Examiner* — Marc Zimmer
(74) *Attorney, Agent, or Firm* — Oliff PLC

(57) ABSTRACT

An addition-curable silicone composition that provides a cured product having a particularly high transparency, an excellent light extraction efficiency and a favorable strength characteristic by subjecting the cured product to a lower refractive index by using a specific composition. The present invention was accomplished by an addition-curable silicone composition, including at least:

(A) a linear organopolysiloxane having 2 or more aliphatic unsaturated groups bonded to a silicon atom and 1 or more $CF_3-(CF_2)_y-(CH_2)_z-$ groups bonded to a silicon atom in one molecule;

(B) an organopolysiloxane having 2 or more aliphatic unsaturated groups bonded to a silicon atom and 1 or more $CF_3-(CF_2)_y-(CH_2)_z-$ groups bonded to a silicon atom in one molecule and having a branch structure of a siloxane unit represented by an $SiO_{4/2}$ and/or an $RSiO_{3/2}$;

(C) an organosilicon compound represented by the following general formula (1); and

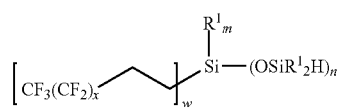

(1)

(D) a platinum group metal-based catalyst.

8 Claims, No Drawings

ADDITION-CURABLE SILICONE COMPOSITION AND OPTICAL ELEMENT

BACKGROUND OF THE INVENTION

1. Field of the Invention

The present invention relates to an addition-curable silicone composition and an optical element, particularly, an addition-curable silicone composition excellent in rubber property and strength characteristic that provides a cured product having a low refractive index and an optical element encapsulated with the cured product of the composition.

2. Description of the Related Art

An addition-curable silicone composition comprises a polyorganosiloxane containing an aliphatic unsaturated group such as an alkenyl group, and provides a cured product obtained by curing the polyorganosiloxane from hydrosilylation reaction. The cured product thus obtained is excellent in heat resistance, cold resistance and electric insulation, and its high transparency is associated with use of each encapsulant for optical purposes.

A polyorganosiloxane composition used for optical purposes and an encapsulant for an optical element comprising the composition are required to meet properties of a high transparency and a high refractive index, and it is a common practice to use a copolymer of dimethylsiloxane and diphenylsiloxane or polymethylphenylsiloxane as a main backbone.

However, the above polysiloxane that provides a cured product having a high refractive index of 1.54 or more is difficult to synthesize. Meanwhile, a cured product of a branched polysiloxane which a phenyl group is introduced is capable of having a refractive index of 1.53 to 1.54, but a cured product obtained is in the form of a hard resin and less elastic. Under the circumstances, a composition composed of a branched organopolysiloxane and a linear organopolysiloxane is proposed, but the composition fails to meet a satisfactory transparency, refractive index and elasticity (Patent Documents 1 to 7).

Therefore, an addition-curable silicone composition that provides a cured product having a high transparency, a high refractive index and a satisfactory strength characteristic, and an encapsulant for an optical element comprising the composition are proposed in Patent Document 8, but the resulting performance of the optical element fails to reach sufficiently favorable level, and particularly, the optical transmission with a wavelength of 400 nm at 25° C. is unfavorable.

PRIOR ART DOCUMENTS

Patent Documents

Patent Document 1: Japanese Patent Laid-Open Publication No. 2005-307015
Patent Document 2: Japanese Patent Laid-Open Publication No. 2004-143361
Patent Document 3: Japanese Patent Laid-Open Publication No. 2004-186168
Patent Document 4: Japanese Patent Laid-Open Publication No. 2004-292807
Patent Document 5: Japanese Patent Laid-Open Publication No. 2004-359756
Patent Document 6: Japanese Patent Laid-Open Publication No. 2005-076003
Patent Document 7: Japanese Patent Laid-Open Publication No. 2005-105217
Patent Document 8: Japanese Patent Laid-Open Publication No. 2010-132795

SUMMARY OF THE INVENTION

The present invention was made to solve the problems mentioned above, and was intended to provide an addition-curable silicone composition that provides a cured product having a particularly high transparency, an excellent light extraction efficiency and a favorable strength characteristic and excellent in performance of an optical element in particular, by subjecting the cured product to a lower refractive index by using a specific composition. In addition, in order to achieve an essentially desired performance of an optical element such as an LED, the present invention is aimed at providing an addition-curable silicone composition having a particularly-improved optical transmission with a wavelength of 400 nm at 25° C.

To solve the problems as mentioned above, the present invention provides an addition-curable silicone composition, comprising at least:

(A) a linear organopolysiloxane having 2 or more aliphatic unsaturated groups bonded to a silicon atom and 1 or more $CF_3$—$(CF_2)_y$—$(CH_2)_z$— groups bonded to a silicon atom in one molecule (y represents an integer of 0 or more and z represents an integer of 1 or more), wherein the amount is 100 parts by mass;

(B) an organopolysiloxane having 2 or more aliphatic unsaturated groups bonded to a silicon atom and 1 or more $CF_3$—$(CF_2)_y$—$(CH_2)_z$— groups bonded to a silicon atom in one molecule and having a branch structure of a siloxane unit represented by an $SiO_{4/2}$ and/or an $RSiO_{3/2}$ (y and z are the same as before and R represents a substituted or unsubstituted monovalent hydrocarbon group), wherein the amount is 1 to 100 parts by mass;

(C) an organosilicon compound represented by the following general formula (1), wherein the molar ratio of an SiH group of (C) component to the total aliphatic unsaturated group of the (A) and the (B) components meets the condition of 0.2≤SiH group/aliphatic unsaturated group≤5.0,

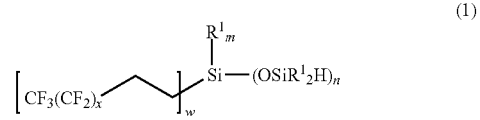

wherein $R^1$ represents a monovalent substituted or unsubstituted organic group having 1 to 10 carbon atoms that may be the same or different, x represents an integer of 0 or more, and w, m and n represent integers according to 1≤w≤2, 0≤m≤1 and 2≤n≤3; and (D) a platinum group metal-based catalyst, wherein the amount is an effective amount.

The addition-curable silicone composition of the present invention is capable of providing a cured product excellent in rubber property and strength characteristic having a low refractive index and a high transparency. When the addition-curable silicone composition is used as an LED encapsulant, it is desired for optical purposes due to its excellent light extraction efficiency.

In addition, the optical transmission with a wavelength of 400 nm at 25° C. is particularly excellent.

When the composition of the present invention is applied for an optical element encapsulant, the addition-curable silicone composition preferably provides a cured product whose optical transmission with a wavelength of 300 to 800nm at 25° C. is 80% or more in a 2 mm thick layer by curing.

Likewise, the addition-curable silicone composition preferably provides a cured product whose refractive index (25° C.) with a visible light (589nm) is 1.40 or less by curing.

Thus, if the refractive index of a cured product is 1.40 or less, the optical transmission with a wavelength of 400nm at 25° C. and the light extraction efficiency can be made more excellent.

In order to fulfill these property requirements, it is necessary to remove an optionally added component that can reduce optical transparency and other properties to a minimum.

In addition, the present invention provides an optical element that is encapsulated with a cured product of the composition.

The optical element of the present invention is excellent in reliability.

As described above, the cured product obtained by curing the addition-curable silicone composition of the present invention has a high transparency, a low refractive index and a favorable strength property. In particular, by using the cured product as an encapsulant for an optical element such as an LED, the optical transmission with a wavelength of 400nm at 25° C. desired as performance of an optical element can be made more excellent. Specifically, by using the addition-curable silicone composition of the present invention as an encapsulant for an optical element, light emitted from the optical element is controlled in total reflection by the surface of the cured product having a high transparency and a low refractive index, resulting in improvement in LED luminance in particular.

DETAILED DESCRIPTION OF THE PREFERRED EMBODIMENTS

The present invention will be described in more detail.

As mentioned above, conventionally, a variety of polyorganosiloxane compositions used for optical purposes have been proposed, none of which provides satisfactory performance of an optical element.

Inventors of the present invention carried out an extensive investigation, and as a result, they found out that a composition excellent in optical performance can be obtained by subjecting an addition-curable silicone composition to a lower refractive index, instead of conventionally-known subjecting the composition to a higher refractive index.

Specifically, the inventors found out that by using a linear and a branched organopolysiloxane, each having a silicon-bonded $CF_3$—$(CF_2)_y$—$(CH_2)_z$— group (y represents an integer of 0 or more and z represents an integer of 1 or more) in one molecule, and an organosilicon compound represented by the following general formula (1) simultaneously, the optical transmission with a wavelength of 300 to 800nm at 25° C., particularly the optical transmission with a wavelength of 400nm at 25° C. can be improved as the addition-curable silicone composition is subjected to a lower refractive index, and an addition-curable silicone cured product having a high transparency and excellent in a strength characteristic can be obtained, and the inventors reached the present invention;

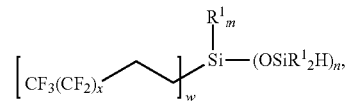

wherein $R^1$ represents a monovalent substituted or unsubstituted organic group having 1 to 10 carbon atoms that may be the same or different, x represents an integer of 0 or more, and w, m and n represent integers according to $1 \leq w \leq 2$, $0 \leq m \leq 1$ and $2 \leq n \leq 3$.

Therefore, the present invention firstly provides an addition-curable silicone composition, comprising at least:

(A) a linear organopolysiloxane having 2 or more aliphatic unsaturated groups bonded to a silicon atom and 1 or more $CF_3$—$(CF_2)_y$—$(CH_2)_z$— groups bonded to a silicon atom in one molecule (y represents an integer of 0 or more and z represents an integer of 1 or more), wherein the amount is 100 parts by mass;

(B) an organopolysiloxane having 2 or more aliphatic unsaturated groups bonded to a silicon atom and 1 or more $CF_3$—$(CF_2)_y$—$(CH_2)_z$— groups bonded to a silicon atom in one molecule and having a branch structure of a siloxane unit represented by an $SiO_{4/2}$ and/or an $RSiO_{3/2}$ (y and z are the same as before and R represents a substituted or unsubstituted monovalent hydrocarbon group), wherein the amount is 1 to 100 parts by mass;

(C) an organosilicon compound represented by the following general formula (1), wherein the molar ratio of an SiH group of (C) component to the total aliphatic unsaturated group of the (A) and the (B) components meets the condition of $0.2 \leq$ SiH group/aliphatic unsaturated group $\leq 5.0$,

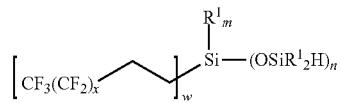

wherein $R^1$ represents a monovalent substituted or unsubstituted organic group having 1 to 10 carbon atoms that may be the same or different, x represents an integer of 0 or more, and w, m and n represent integers according to $1 \leq w \leq 2$, $0 \leq m \leq 1$ and $2 \leq n \leq 3$; and (D) a platinum group metal-based catalyst, wherein the amount is an effective amount.

The present invention secondly provides an optical element that is encapsulated with a cured product of the addition-curable silicone composition of the present invention.

The present invention will be described in detail.

<(A) Component>

(A) component is a linear organopolysiloxane having 2 or more aliphatic unsaturated groups bonded to a silicon atom and 1 or more $CF_3$—$(CF_2)_y$—$(CH_2)_z$— groups bonded to a silicon atom in one molecule (y represents an integer of 0 or more and z represents an integer of 1 or more).

The organopolysiloxane of the (A) component is a base polymer, preferably e.g. an organopolysiloxane represented by the following general formula (2).

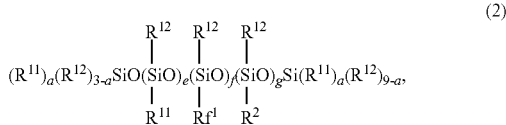
(2)

wherein $R^{11}$ represents an aliphatic unsaturated group, $R^{12}$ represents a substituted or unsubstituted monovalent hydrocarbon group having 1 to 8 carbon atoms other than an aliphatic unsaturated group, and each $R^{12}$ may be the same or different, $Rf^1$ represents a $CF_3\!-\!(CF_2)_y\!-\!(CH_2)_z\!-\!$ group (y and z are the same as before, a is an integer of 1 to 3, and e, f and g are integers according to e≥0, f≥1 and g≥0).

The aliphatic unsaturated group of the $R^{11}$ in the above general formula (2) is preferably an alkenyl group or an alkynyl group having 2 to 10 carbon atoms such as a vinyl group, an allyl group and an ethynyl group, particularly an alkenyl group or an alkynyl group having 2 to 6 carbon atoms, and more particularly a vinyl group.

Example of the substituted or unsubstituted monovalent hydrocarbon having 1 to 8 carbon atoms other than the aliphatic unsaturated group of the $R^{12}$ includes an alkyl group such as a methyl group, an ethyl group, a propyl group and a butyl group; a cycloalkyl group such as a cyclohexyl group and a cyclopentyl group; an aryl group such as a phenyl group, a tolyl group and a xylyl group; an aralkyl group such as a benzyl group and a phenylethyl group; and a halogenated hydrocarbon group such as a chloromethyl group, a chloropropyl group and a chlorocyclohexyl group; preferably an unsubstituted monovalent hydrocarbon group having 1 to 6 carbon atoms, particularly a methyl group.

$Rf^1$ is defined as a $CF_3\!-\!(CF_2)_y\!-\!(CH_2)_z\!-\!$ (y and z are the same as before), y is preferably an integer that meets the condition of 0≤y≤9, and z is preferably an integer that meets the condition of 1≤z≤10 plurality of $Rf^1$s (when f is 2 or more) may be the same or different respectively.

In the present invention, a $CF_3\!-\!(CH_2)_2\!-\!$, a $CF_3\!-\!(CF_2)_3\!-\!(CH_2)_2\!-\!$ and a $CF_3\!-\!(CF_2)_5\!-\!(CH_2)_2\!-\!$ groups are particularly preferable in view of synthesis.

In the above general formula (2), e is an integer of 0 or more, preferably an integer of 0 to 50, f is an integer of 1 or more, preferably 2 to 5,000, more preferably 5 to 1,000. g is an integer of 0 or more, preferably 0 to 10,000, more preferably 0 to 5,000. e+f+g is preferably an integer of 5 to 10,000, more preferably 10 to 3,000, and particularly preferably 20 to 500. f/(e+f+g) is preferably 1/50 to 1/1, more preferably 1/10 to 1/1, and particularly preferably 1/5 to 1/1.

The viscosity of the organopolysiloxane of the (A) component at 25° C. is preferably 100 to 10,000,000mPa·s, particularly preferably 200 to 500,000mPa·s. The organopolysiloxane can be used alone or in combination with two or more kinds thereof. The viscosity is measured by a rotational viscometer.

The organopolysiloxane of the (A) component itself can be produced by a known method, e.g. by copolymerization of a cyclotrisiloxane represented by the following general formula (i), a cyclotrisiloxane represented by the following general formula (ii), an organosiloxane represented by the following general formula (iii), and if required, a cyclotrisiloxane represented by the following general formula (iv) in the presence of an alkali catalyst or an acid catalyst.

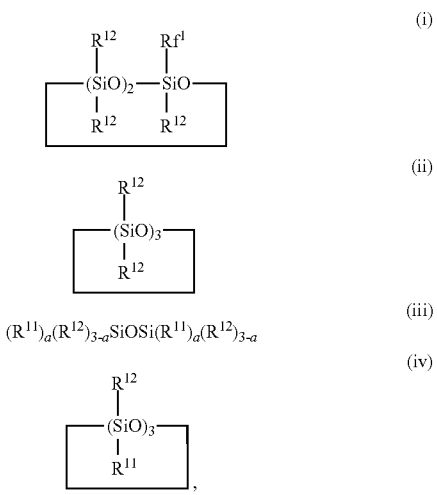

wherein $R^{11}$, $R^{12}$, $Rf^1$ and a are the same as before.

<(B) Component>

(B) component is an organopolysiloxane having 2 or more aliphatic unsaturated groups bonded to a silicon atom and 1 or more $CF_3\!-\!(CF_2)_y\!-\!(CH_2)_z\!-\!$ groups bonded to a silicon atom in one molecule and having a branch structure of a siloxane unit represented by an $SiO_{4/2}$ and/or an $RSiO_{3/2}$ (y represents an integer of 0 or more, z represents an integer of 1 or more, R represents a substituted or unsubstituted monovalent hydrocarbon group, and example of R includes the above $R^{11}$ and $R^{12}$). In a plurality of siloxane units having an R, Rs may be the same or different respectively.

Example of the silicon atom-bonded aliphatic unsaturated group includes the same one as described in the (A) component.

The organopolysiloxane of the (B) component has a branch structure. The organopolysiloxane of the (B) component must have a branch structure composed of an $SiO_{4/2}$ unit and/or an $RSiO_{3/2}$ unit, and may contain an $R_2SiO_{2/2}$ such as a methylvinylsiloxy unit and a dimethylsiloxy unit and an $R_3SiO_{1/2}$ unit such as a dimethylvinylsiloxy unit and a trimethylsiloxy unit (R is the same as before). The content of the $SiO_{4/2}$ unit and/or the $RSiO_{3/2}$ unit is preferably 5 mole % or more, more preferably 10 to 95 mole %, and particularly preferably 25 to 80 mole % relative to all the siloxane unit of the organopolysiloxane resin of the (B) component.

The weight average molecular weight of the organopolysiloxane is preferably 500 to 100,000 in view of isolation.

In addition, since the (B) component has a substituent defined as the $CF_3\!-\!(CF_2)_y\!-\!(CH_2)_z\!-\!$ in the above (A) component (y and z are the same as before) as well, the (B) component can be subjected to a lower refractive index. In the present invention, $CF_3\!-\!(CH_2)_2\!-\!$, $CF_3\!-\!(CF_2)_3\!-\!(CH_2)_2\!-\!$ and $CF_3\!-\!(CF_2)_5\!-\!(CH_2)_2\!-\!$ groups are particularly preferable like the (A) component in view of synthesis.

The organopolysiloxanes of the resin structures can readily be synthesized by combining compounds that are sources of respective units so as to determine each produced unit at a predetermined rate, e.g. by (co-) hydrolysis in the presence of an acid.

Use of the organopolysiloxane having a branch structure of the (B) component simultaneously can make excellent the hardness and mechanical strength of a cured product obtained without improving a refractive index. The (B) component is 1 to 100 parts by mass, preferably 2 to 50 parts by mass, relative to 100 parts by mass of the (A) component. When the amount of the (B) component to be blended is under 1 part by mass, the hardness and strength of the cured product can be insufficient. When the amount of the (B) component to be blended exceeds 100 parts by mass, the cured product can be brittle, resulting in reduction in encapsulating performance.

<(C) Component>

(C) component is an organosilicon compound represented by the following general formula (1). It is a fluorine-modified organosilicon compound to subject a composition to a lower refractive index and improve compatibility between the (A) and (B) components, transparency and crosslinked reaction rate, and preferably an organosilicon compound (organosilicon compound containing SiH group) having no aliphatic unsaturated group. The (C) component makes hydrosilylation reaction with the (A) and (B) components to act as a crosslinking agent. The (C) component may be used alone or in combination with two or more kinds thereof.

The (C) component is an organosilicon compound that meets the following condition;

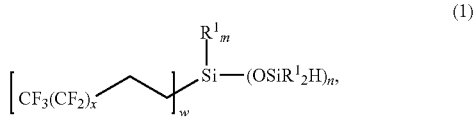
(1)

wherein $R^1$ represents a monovalent substituted or unsubstituted organic group having 1 to 10 carbon atoms that may be the same or different, x represents an integer of 0 or more, and w, m and n represent integers according to $1 \leq w \leq 2$, $0 \leq m \leq 1$ and $2 \leq n \leq 3$.

In the above general formula (1), the $R^1$ is an unsubstituted or substituted monovalent hydrocarbon group having 1 to 10 carbon atoms, preferably having 1 to 8 carbon atoms.

Illustrative example of the $R^1$ includes an alkyl group having 1 to 10 carbon atoms such as a methyl group, an ethyl group, a propyl group, an isopropyl group, a butyl group, an isobutyl group, a sec-butyl group, a tert-butyl group, a pentyl group, an isopentyl group, a neopentyl group, a hexyl group, a heptyl group, a 1-ethylpentyl group, an octyl group, a 2-ethylhexyl group, a nonyl group and a decyl group, preferably having 1 to 8 carbon atoms, more preferably having 1 to 6 carbon atoms; a cycloalkyl group having 3 to 10 carbon atoms such as a cyclopropyl group, a cyclobutyl group, a cyclopentyl group, a cyclohexyl group, a cycloheptyl group, a cyclooctyl group, a cyclononyl group and a cyclodecyl group, preferably having 4 to 7 carbon atoms, more preferably having 5 to 6 carbon atoms; an aryl group having 6 to 10 carbon atoms such as a phenyl group, a tolyl group, a xylyl group, a trimethylphenyl group and a naphthyl group, preferably having 6 to 9 carbon atoms, more preferably having 6 to 8 carbon atoms; an aralkyl group having 7 to 10 carbon atoms such as a benzyl group, a phenylethyl group, a phenylpropyl group and a phenylbutyl group, preferably having 7 to 9 carbon atoms, more preferably having 7 to 8 carbon atoms; a group obtained by substituting a part or all of hydrogen atoms bonded to a carbon atom of the above hydrocarbon group with a halogen atom (e.g. a fluorine atom, a chlorine atom, a bromine atom and an iodine atom) and a cyano group, e.g. a chloromethyl group, a bromoethyl group, a 3,3,3-trifluoropropyl group, a 2-(nonafluorobutyl) ethyl group and p-chlorophenyl group.

Among these groups, a methyl group, an ethyl group, a propyl group and phenyl group are preferable in view of a property of readily synthesizing the organosilicon compound of the present invention and economical production, and particularly preferable a methyl group.

Illustrative example of the organosilicon compound represented by the above general formula (1) includes the following compound, but not restricted thereto.

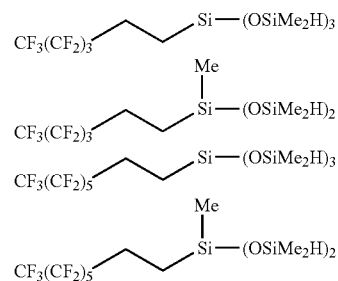

The organosilicon compound of the present invention obtained can be purified by a known method such as water-washing, distillation and concentration.

The organic group bonded to a silicon in the (C) component preferably has no aliphatic unsaturated group, and example of the organic group bonded to a silicon in the (C) component includes an unsubstituted monovalent hydrocarbon group, or a monovalent hydrocarbon group substituted with a halogen atom (e.g. a chlorine atom, a bromine atom and a fluorine atom), an epoxy group-containing group (e.g. an epoxy group, a glycidyl group and a glycidoxy group) and an alkoxy group (e.g. a methoxy group, an ethoxy group, a propoxy group and a butoxy group). Example of the substituted or unsubstituted monovalent hydrocarbon group includes an alkyl group having 1 to 6 carbon atoms and an aryl group having 6 to 10 carbon atoms, more preferably a methyl group or an ethyl group, or a group obtained by substituting one of these groups with the above described substituent. In addition, when an epoxy group-containing group and/or an alkoxy group is contained as a substituent of the monovalent hydrocarbon group, the cured product of the addition-curable silicone composition of the present invention can be provided with an adhesion property.

Also, introduction of a substituent defined as a $CF_3$—$(CF_2)_y$—$(CH_2)_z$— (y represents an integer of 0 or more and z represents an integer of 1 or more) in the above described (A) and (B) components into the (C) component is preferable since it can lower a refractive index of the composition, and improve compatibility between the (A) and (B) components, transparency and crosslinked reaction rate. In the present invention, a $CF_3$—$(CH_2)_2$—, a $CF_3$—$(CF_2)_3$—$(CH_2)_2$— and a $CF_3$—$(CF_2)_5$—$(CH_2)_2$— groups are particularly preferable in view of synthesis.

The amount of the (C) component to be blended is determined so that the molar ratio of an SiH group in the (C) component relative to the total aliphatic unsaturated group in the (A) and (B) components is $0.2 \leq$ SiH group/aliphatic unsaturated group $\leq 5.0$, preferably $0.5 \leq$ SiH group/aliphatic unsaturated group $\leq 2.0$.

<(D) Component>

(D) component is a platinum group metal-based catalyst that promotes hydrosilylation (addition reaction) of the (A), (B) and (C) components.

The platinum group metal-based catalyst of the (D) component can be any catalyst so long as it promotes hydrosilylation (addition reaction) of the silicon atom-bonded aliphatic unsaturated group in the (A) and (B) components and the SiH group in the (C) component. The (D) component may be used alone or in combination with two or more kinds thereof. Example of the (D) component includes a platinum group metal such as platinum, palladium and rhodium, a chloroplatinic acid, an alcohol-modified chloroplatinic acid, a coordinate compound of a chloroplatinic acid with an olefin, a vinylsiloxane or an acetylene compound, a platinum group metal compound such as tetrakis (triphenylphosphine) palladium and chlorotris (triphenylphosphine) rhodium, and particularly preferably a platinum compound.

The amount of the (D) component to be blended may be an effective amount of a hydrosilylation catalyst, preferably 0.1 to 1,000 ppm, more preferably 1 to 500 ppm converted into mass of a platinum group metal element relative to the total of the (A), (B) and (C) components.

<Other Components>

Other optional components can be blended into the addition-curable silicone composition of the present invention, other than the (A) to (D) components. Illustrative example thereof includes the following components and they may be used alone or in combination with two or more kinds thereof respectively.

<<Aliphatic Unsaturated Group-Containing Compound Other than (A) and (B) Components>>

An aliphatic unsaturated group-containing compound that makes addition reaction with the (C) component may be blended into the addition-curable silicone composition of the present invention other than the (A) and (B) components. The aliphatic unsaturated group-containing compound other than the (A) and (B) components preferably involves forming a cured product. Therefore, it preferably has at least two aliphatic unsaturated groups in one molecule. A molecular structure of the polyorganosiloxane other than the (A) and (B) components is e.g. a cyclic structure.

Example of the aliphatic unsaturated group-containing compound other than the (A) and (B) components includes a monomer such as butadiene and diacrylate derived from a polyfunctional alcohol; a polyolefin such as copolymer of polyethylene, polypropylene or a styrene and other unsaturated ethylene compounds (e.g. acrylonitrile or butadiene); an oligomer or a polymer derived from a polyfunctional substituted organic compound such as an ester of an acrylic acid, a methacrylic acid or maleic acid. The aliphatic unsaturated group-containing compound other than the (A) and (B) components may be in the form of a liquid or a solid at room temperature.

<<Addition Reaction Retarder>>

In order to provide a desired pot life, an addition reaction retarder can be blended into the addition-curable silicone composition of the present invention. The addition reaction retarder is not particularly restricted if it is a compound having an effect of controlling curing on the hydrosilylation catalyst of the above (D) component, and conventionally known compounds can be used. Example thereof includes a phosphorus-containing compound such as triphenylphosphine; a nitrogen-containing compound such as tributylamine, tetramethylethylenediamine and benzotriazole; a sulfur-containing compound; an acetylene-based compound such as acetylene alcohols (e.g. 1-ethynylcyclohexanol and 3,5-dimethyl-1-hexyne-3-01); a compound containing two or more alkenyl groups; a hydroperoxy compound; and a maleic acid derivative.

The degree of an effect of controlling curing by the addition reaction retarder varies according to a chemical structure of the addition reaction retarder. Thus, in each addition reaction retarder used, the amount thereof to be added is preferably adjusted to a most appropriate level. By adding the most appropriate amount of the addition reaction retarder, the composition can be made excellent in long-term preservation stability at room temperature and heat curing property.

<<Other Optional Components>>

In order to reduce coloring, turbidity and degradation by oxidization in a cured product, a conventionally known antioxidant such as a 2,6-di-t-butyl-4-methylphenol can be blended into the addition-curable silicone composition of the present invention. To provide resistance against photo degradation, a light stabilizer such as a hindered amine light stabilizer can be blended into the addition-curable silicone composition of the present invention. Moreover, an inorganic filler such as a fumed silica may be blended into the addition-curable silicone composition of the present invention to improve the strength so that transparency of a cured product obtained from the addition-curable silicone composition of the present invention is not affected. If required, a dye, a pigment, a flame retarder, etc. may be blended into the addition-curable silicone composition of the present invention.

Cured Product

The addition-curable silicone composition of the present invention can be cured by known curing methods under known curing conditions. Specifically, the addition-curable silicone composition normally can be cured by heating the composition at room temperature to 200° C., preferably 80 to 160° C. The heating time is preferably 0.5 minutes to 5 hours, particularly 1 minute to 3 hours, and the curing time is preferably longer in cases where a higher precision of LED encapsulation is required. The embodiment of a cured product obtained is not particularly restricted, and may be e.g. any of a gel cured product, an elastomer cured product and a resin cured product. When the cured product is used for encapsulating an optical element, it is preferable that the cured product is colorless and transparent and a refractive index thereof is lower (normally 1.41 or less). The optical transmission with a wavelength of 300 to 800nm at 25° C. is particularly preferably 80% or more in a 2 mm thick layer.

In order to improve essentially desired performance of an optical element such as an LED, particularly an optical transmission with a wavelength of 400nm at 25° C., the refractive index (25° C.) of a cured product with a visible light (589nm) is preferably 1.40 or less, particularly preferably 1.30 to 1.39.

A cured product obtained by curing the addition-curable silicone composition of the present invention is also excellent in heat resistance, cold resistance and electric insulation like a cured product of a commonly-used addition-curable silicone composition.

Optical Element Encapsulant

As described above, a cured product obtained by curing the composition can be obtained in the form of an elastomer, e.g. a gel, or an elastic rubber and an elastic resin.

The addition-curable silicone composition of the present invention particularly exhibits a high optical transmission of a cured product, and it is excellent in light extraction efficiency when the optical element is encapsulated, thereby presenting optimal optical purposes, particularly an optical element encapsulant.

Optical Element

Also in the present invention, the addition-curable silicone composition of the present invention is applied to e.g. an LED, a semiconductor laser, a photodiode, a phototransistor, a solar cell and a CCD. The present invention provides an optical element encapsulated by curing an encapsulant applied by a known curing method under known curing conditions, specifically as described above.

EXAMPLES

The present invention will be described in detail with reference to Synthetic Examples, Preparation Examples, Examples and Comparative Examples. The present invention is not restricted to these Examples.

In the Examples described below, the viscosity is measured by a rotational viscometer at 23° C.

The refractive index measured with a wavelength of 589nm at 25° C. by using ATAGO digital refractometer (RX-5000), and the hardness, breaking elongation and tensile strength were measured by a No. 2 dumbbell in accordance with JIS-K6249.

The optical transmission for a light with a wavelength of 400nm at 25° C. was measured by a spectrophotometer by using a composition formed and cured 2mm thick sheet.

In the following examples, the symbols indicating the average composition of a linear organopolysiloxane or an organopolysiloxane having a branch structure are denoted as the following units.

Furthermore, the mole of each linear organopolysiloxane or each organopolysiloxane having a branch structure and each organohydrogen polysiloxane is an average mole of a vinyl group or an SiH group contained in each component.

$M^{Vi}$: $(CH_2=CH)(CH_3)_2SiO_{1/2}$
D: $(CH_3)_2SiO_{2/2}$
$D^{Vi}$: $(CH_2=CH)(CH_3)SiO_{2/2}$
$D^{F1}$: $(CF_3-CH_2-CH_2(CH_3)SiO_{2/2}$
$T^{F1}$: $(CF_3-CH_2-CH_2)SiO_{2/2}$
$D^{F2}$: $[CF_3-(CF_2)_5-(CH_2)_2](CH_3)SiO_{2/2}$
$T^{F2}$: $[CF_3-(CF_2)_5-(CH_2)_2]SiO_{3/2}$
$D^{\Phi}$: $(C_6H_5)_2SiO_{2/2}$

Synthetic Example 1

First, 66.3 g of 1,1,3,3-tetramethyldisiloxane (0.50mol), 13.4 g of concentrated hydrochloric acid and 9.8 g of water were charged into a 500mL four-neck flask having an agitation apparatus, a coiled condenser, a dropping funnel and a thermometer, and agitated so that the temperature was controlled at 10 to 15° C. using water bath. After temperature control, 138.7 g of 3,3,4,4,5,5,6,6,7,7,8,8,8-tridecafluorooctyltrimethoxysilane (0.30mol) was added dropwise so that the temperature was controlled at 15° C. or less. Thereafter, the product was agitated at 10 to 15° C. for 1 hour, subjected to separation of waste acid and repeatedly washed with water for neutralization, concentrated for 1 hour under the condition of 100° C./8mmHg and filtered with an NA-500 to obtain 159.5 g of desired 3,3,4,4,5,5,6,6,7,7,8,8,8-tridecafluoroocty-tris(dimethylsiloxy)silane (crude yield: 89%).

The above compound was identified with the amount of hydrogen gas generated (118ml/g) (theoretical amount: 112ml/g).

Synthetic Example 2

First, 66.3 g of 1,1,3,3-tetramethyldisiloxane (0.50mol), 13.4 g of concentrated hydrochloric acid and 9.8 g of water were charged into a 500mL four-neck flask having an agitation apparatus, a coiled condenser, a dropping funnel and a thermometer, and agitated so that the temperature was controlled at 10 to 15° C. using water bath. After temperature control, 64.9 g of 3,3,3-trifluoropropyltrimethoxysilane (0.30mol) was added dropwise so that the temperature was controlled at 15° C. or less. Thereafter, the product was agitated at 10 to 15° C. for 1 hour, subjected to separation of waste acid and repeatedly washed with water for neutralization, and subjected to distillation under reduced pressure (main fraction: 58 to 63° C./8mmHg) to obtain 82.9 g of desired 3,3,3-trifluoropropyl-tris(dimethylsiloxy)silane (isolated yield: 79%).

The above compound was identified with the amount of hydrogen gas generated (200ml/g) (theoretical amount: 192ml/g).

Preparation Example 1

Preparation of Platinum Catalyst (Catalyst A)

A reaction product of hexachloroplatinic acid and sym-tetramethyldivinyldisiloxane was diluted with toluene so that the platinum content was 1.0% by mass to prepare a platinum catalyst (catalyst A) used in the Examples and Comparative Examples.

Preparation Example 2

Synthesis of Organopolysiloxane of Branch Structure Represented by $D^{Vi}/T^{F2}=2/8$ First, 160 g of hexafluorometaxylene, 290 g of water and 323 g of concentrated hydrochloric acid were added to a 2L flask and agitated, and the temperature was raised up to 70° C. Thereafter, 375 g of perfluorooctyltrimethoxysilane (0.8mol), 26 g of methylvinyldimethoxysilane (0.2mol) and 40 g of hexafluorometaxylene were added dropwise. Thereafter, the product was matured at 75° C. for 2 hours. After maturing and removing an aqueous hydrochloric acid in the upper layer, the organic layer was washed with water, and this step was repeated until the washing water showed neutrality. Thereafter, 0.1 g of potassium hydroxide was added to the organic layer, and the temperature was raised up to 120° C. for dehydration condensation. Thereafter, 1 g of potassium acetate and 0.23 g of chlorotrimethylsilane were added for neutralization. After neutralization, the product was filtered and concentrated for 1 hour under the condition of 100° C./5mmHg to obtain an organopolysiloxane of a branch structure represented by $D^{Vi}/T^{F2}=2/8$

Preparation Example 3

Synthesis of Organopolysiloxane of Branch Structure Represented by $D^{Vi}/T^{F1}=2/8$ First, 160 g of hexafluorometaxylene, 290 g of water and 323 g of concentrated hydrochloric acid were added to a 2L flask and agitated, and the temperature was raised up to 70° C. Thereafter, 175 g of trifluoropropyltrimethoxysilane (0.8mol), 26 g of methylvinyldimethoxysilane (0.2mol) and 40 g of hexafluorometaxylene were added dropwise. Thereafter, the product was matured at 75° C. for 2 hours. After maturing and removing an aqueous hydrochloric acid in the upper layer, the organic layer was washed with water, and this step was repeated until the washing water showed neutrality. Thereafter, 0.1 g of potassium hydroxide was added to the organic layer, and the temperature was raised up to 120° C. for dehydration condensation. Thereafter, 1 g of potassium acetate and 0.23 g of chlorotrimethylsilane were added for neutralization. After neutralization, the product was filtered and concentrated for 1 hour under the condition of 100° C./5mmHg to obtain a colorless and transparent organopolysiloxane of a branch structure represented by $D^{Vi}/T^{F1}=2/8$.

Preparation Example 4

Synthesis of Linear Organopolysiloxane Represented by Average Composition Formula: $M^{Vi}{}_2D^{\Phi}{}_{2.8}$ First, 1,000 of Water and 585 g of toluene were charged into a 2L flask, heated up to 75° C. and 500 g of dichlorodiphenylsilane was added thereto dropwise and agitated at 80° C. for 5 hours. After cooling at room temperature, the water layer was separated. The organic layer was dried with 50 g of anhydrous sodium sulfate and filtered to obtain a toluene solution of a dichlorodiphenylsilane hydrolysis oligomer. Then, 357 g of chlorodimethylvinylsilane, 300 g of triethylamine and 650 g of toluene were charged into a 5L flask, cooled at 10° C., the toluene solution of the dichlorodiphenylsilane hydrolysis oligomer obtained was added thereto dropwise and then agitated at 80° C. for 5 hours. After cooling at room temperature, 2,250 g of dilute hydrochloric acid (2250g) was mixed therein and the water layer was separated. The organic layer was washed with a sodium bicarbonate water and water, and the toluene was removed by concentration under reduced pressure. Activated carbon treatment was performed to obtain a colorless and transparent linear organopolysiloxane represented by an average composition formula: $M^{Vi}{}_2 D^{\Phi}{}_{2.8}$.

Example 1

A mixture of 95.0 g of linear organopolysiloxane represented by an average composition formula: $M^{Vi}{}_2 D^{F1}{}_{27.3}$ (viscosity controlled by acid balance: 2.0Pa·s) (0.035 mole), 5.0 g of organopolysiloxane of a branch structure represented by $D^{Vi}/T^{F1}=2/8$ (synthetic product in Preparation Example 3) (0.002 mole) and 4.7 g of organohydrogen polysiloxane represented by Synthetic Example 2 (0.040 mole) was mixed with 0.075 g of ethynylcyclohexanol as a retarder and 0.15 g of catalyst A to obtain a silicone composition. The composition was heated at 150° C. for 2 hours to be cured and physical properties of an elastomer obtained were measured. The results of each measurement are shown in Table 1.

Example 2

A mixture of 95.0 g of linear organopolysiloxane represented by an average composition formula: $M^{Vi}{}_2 D^{F2}{}_{27.3}$ (viscosity controlled by acid balance: 5.2Pa·s) (0.018 mole), 5.0 g of organopolysiloxane of a branch structure represented by $D^{Vi}/T^{F2}=2/8$ (synthetic product in Preparation Example 2) (0.001 mole) and 4.2 g of organohydrogen polysiloxane represented by Synthetic Example 1 (0.021 mole) was mixed with 0.075 g of ethynylcyclohexanol as a retarder and 0.15 g of catalyst A to obtain a silicone composition. The composition was heated at 150° C. for 2 hours to be cured and physical properties of an elastomer obtained were measured. The results of each measurement are shown in Table 1.

Comparative Example 1

A mixture of 95.0 g of linear organopolysiloxane represented by an average composition formula: $M^{Vi}{}_2 D^{71}{}_{27.3}$ (viscosity controlled by acid balance: 2.0Pa·s) (0.035 mole), 5.0 g of organopolysiloxane of a branch structure represented by $D^{Vi}/T^{F1}=2/8$ (synthetic product in Preparation Example 3) (0.002 mole) and 4.7 g of composition represented by the following formula (v) (0.040 mole) was mixed with 0.075 g of ethynylcyclohexanol as a retarder and 0.15 g of catalyst A to obtain a silicone composition. The composition was heated at 150° C. for 2 hours to be cured and physical properties of an elastomer obtained were measured. The results of each measurement are shown in Table 1.

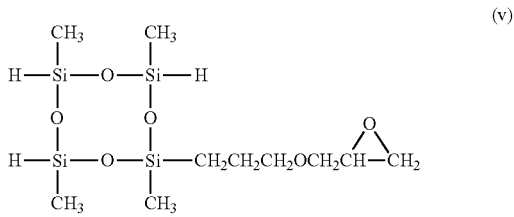

(v)

Comparative Example 2

A mixture of 95.0 g of linear organopolysiloxane represented by an average composition formula: $M^{Vi}{}_2 D^{F2}{}_{27.3}$ (viscosity controlled by acid balance: 5.2Pa·s) (0.018 mole), 5.0 g of organopolysiloxane of a branch structure represented by $D^{Vi}/T^{F2}=2/8$ (synthetic product in Preparation Example 2) (0.001 mole) and 2.5 g of composition represented by the above formula (v) (0.021 mole) was mixed with 0.075 g of ethynylcyclohexanol as a retarder and 0.15 g of catalyst A to obtain a silicone composition. The composition was heated at 150° C. for 2 hours to be cured and physical properties of an elastomer obtained were measured. The results of each measurement are shown in Table 1.

Comparative Example 3

A mixture of 100.0 g of linear organopolysiloxane represented by an average composition formula: $M^{Vi}{}_2 D_{146}$ (viscosity controlled by base balance: 0.4Pa·s) (0.019 mole) and 2.5 g of composition represented by the above formula (v) (0.021 mole) was mixed with 0.075 g of ethynylcyclohexanol as a retarder and 0.15 g of catalyst A to obtain a silicone composition. The composition was heated at 150° C. for 2 hours to be cured and physical properties of an elastomer obtained were measured. The results of each measurement are shown in Table 1.

Comparative Example 4

A mixture of 100.0 g of linear organopolysiloxane represented by an average composition formula of $M^{vi}{}_2 D^{\Phi}{}_{2.8}$ (viscosity: 0.4Pa·s) (0.22 mole) and 28.5 g of composition represented by the above formula (v) (0.24 mole) was mixed with 0.075 g of ethynylcyclohexanol as retarder and 0.15 g of catalyst A to obtain a silicone composition. The composition was heated at 150° C. for 2 hours to be cured and physical properties of an elastomer obtained were measured. The results of each measurement are shown in Table 1.

TABLE 1

|  | Example 1 | Example 2 | Comparative Example 1 | Comparative Example 2 | Comparative Example 3 | Comparative Example 4 |
| --- | --- | --- | --- | --- | --- | --- |
| Appearance | Colorless and transparent | Colorless and transparent | Colorless and transparent | Colorless and transparent | Colorless and transparent | Colorless and transparent |
| Reflective index ($n_D^{25}$) | 1.37 | 1.34 | 1.38 | 1.35 | 1.41 | 1.54 |

TABLE 1-continued

|  | Example 1 | Example 2 | Comparative Example 1 | Comparative Example 2 | Comparative Example 3 | Comparative Example 4 |
|---|---|---|---|---|---|---|
| Hardness (Type A) | 24 | 32 | 23 | 30 | 33 | 55 |
| Breaking elongation (%) | 70 | 90 | 80 | 90 | 40 | 30 |
| Tensile strength (MPa) | 1.6 | 2.1 | 1.0 | 1.2 | 0.5 | 1.2 |
| light transmittance with 400 nm (%) | 96.0 | 97.2 | 95.1 | 96.4 | 93.1 | 89.4 |

As shown in Table 1, the addition-curable silicone composition obtained by using the organosilicon compound of the present invention (Examples 1 and 2) exhibits a high transparency in a cured product of the composition, particularly a high tensile strength, and a favorable strength characteristic as an elastomer and thus overall preferable results compared to Comparative Examples 1 to 4.

It was also confirmed that as the refractive index is lower, the optical transmission with a wavelength of 400nm at 25° C. can be improved.

It must be stated here that the present invention is not restricted to the embodiments shown by the embodiments. The above-mentioned embodiments are merely examples so that any embodiments composed of substantially the same technical concept as disclosed in the claims of the present invention and expressing a similar effect are included in the technical scope of the present invention.

What is claimed is:

1. An addition-curable silicone composition, comprising at least:
   (A) a linear organopolysiloxane having 2 or more aliphatic unsaturated groups bonded to a silicon atom and 1 or more $CF_3$—$(CF_2)_y$—$(CH_2)_z$— groups bonded to a silicon atom in one molecule (y represents an integer of 0 or more and z represents an integer of 1 or more), wherein the amount is 100 parts by mass;
   (B) an organopolysiloxane having 2 or more aliphatic unsaturated groups bonded to a silicon atom and 1 or more $CF_3$—$(CF_2)_y$—$(CH_2)_z$— groups bonded to a silicon atom in one molecule and having a branch structure of a siloxane unit represented by an $SiO_{4/2}$ and/or an $RSiO_{3/2}$ (y and z are the same as before and R represents a substituted or unsubstituted monovalent hydrocarbon group), wherein the amount is 1 to 100 parts by mass;
   (C) an organosilicon compound represented by the following general formula (1), wherein the molar ratio of an SiH group of (C) component to the total aliphatic unsaturated group of the (A) and the (B) components meets the condition of 0.2≤SiH group/aliphatic unsaturated group≤5.0,

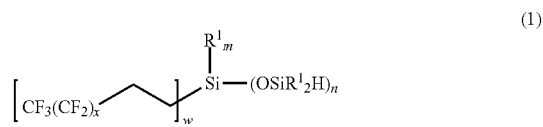

(1)

wherein $R^1$ represents a monovalent substituted or unsubstituted organic group having 1 to 10 carbon atoms that may be the same or different, x represents an integer of 0 or more, and w, m and n represent integers according to 1≤w≤2, 0≤m≤1 and 2≤n≤3; and
   (D) a platinum group metal-based catalyst, wherein the amount is an effective amount.

2. The addition-curable silicone composition according to claim 1, wherein the addition-curable silicone composition provides a cured product whose optical transmission with a wavelength of 300 to 800nm at 25° C. is 80% or more in a 2 mm thick layer by curing.

3. The addition-curable silicone composition according to claim 1, wherein the addition-curable silicone composition provides a cured product whose refractive index (25° C.) with a visible light (589nm) is 1.40 or less by curing.

4. The addition-curable silicone composition according to claim 2, wherein the addition-curable silicone composition provides a cured product whose refractive index (25° C.) with a visible light (589nm) is 1.40 or less by curing.

5. An optical element that is encapsulated with a cured product of the addition-curable silicone composition according to claim 1.

6. An optical element that is encapsulated with a cured product of the addition-curable silicone composition according to claim 2.

7. An optical element that is encapsulated with a cured product of the addition-curable silicone composition according to claim 3.

8. An optical element that is encapsulated with a cured product of the addition-curable silicone composition according to claim 4.

* * * * *